(12) United States Patent
Dubey et al.

(10) Patent No.: US 6,343,337 B1
(45) Date of Patent: Jan. 29, 2002

(54) WIDE SHIFTING IN THE VECTOR PERMUTE UNIT

(75) Inventors: Pradeep Kumar Dubey, White Plains, NY (US); Brett Olsson, Round Rock; Charles Philip Roth, Austin, both of TX (US); Keith Everett Diefendorf; Ronald Ray Hochsprung, both of Los Gatos, CA (US); Hunter Ledbetter Scales, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,058

(22) Filed: May 17, 2000

Related U.S. Application Data

(62) Division of application No. 09/149,466, filed on Sep. 8, 1998.

(51) Int. Cl.[7] .................... G06F 13/00; G06F 13/38
(52) U.S. Cl. ................ 710/132; 710/131; 708/209; 712/2
(58) Field of Search ................ 710/131, 132; 712/1–7, 20–24; 708/209

(56) References Cited

U.S. PATENT DOCUMENTS

| | | | | |
|---|---|---|---|---|
| 4,740,993 A | * | 4/1988 | Skubnik | 375/249 |
| 5,155,698 A | * | 10/1992 | Niimi | 708/209 |
| 5,262,971 A | * | 11/1993 | Yamaguchi | 708/209 |
| 5,471,628 A | * | 11/1995 | Phillips et al. | 712/223 |
| 5,557,734 A | * | 9/1996 | Wilson | 395/505 |
| 5,726,926 A | * | 3/1998 | Makino | 708/505 |
| 5,948,050 A | * | 9/1999 | Diamondstein et al. | 708/209 |
| 5,996,057 A | * | 11/1999 | Scales, III et al. | 712/5 |
| 6,119,224 A | * | 9/2000 | Roth | 712/300 |
| 6,178,500 B1 | * | 1/2001 | Roth | 712/300 |

* cited by examiner

*Primary Examiner*—Rupal Dharia
(74) *Attorney, Agent, or Firm*—Anthony V. S. England; Bracewell & Patterson, L.L.P.

(57) ABSTRACT

A crossbar is implemented within multimedia facilities of a processor to perform vector permute operations, in which the bytes of a source operand are reordered in the target output. The crossbar is then reused for other instructions requiring multiplexing or shifting operations, particularly those in which the size of additional multiplexers or the size and delay of a barrel shifter is significant. A wide shift operation, for example, may be performed with one cycle latency by the crossbar and one additional layer of multiplexers or a small barrel shifter. The crossbar facility thus gets reused with improved performance of the instructions now sharing the crossbar and a reduction in the total area required by a multimedia facility within a processor.

20 Claims, 3 Drawing Sheets

WIDE SHIFTING IN THE VECTOR PERMUTE UNIT

RELATED APPLICATIONS

This is a Division of application Ser. No. 09/149,466, filed Sep. 8, 1998, currently pending.

The present invention is related to the subject matter of the following copending United States patent applications: Ser. No. 09/104,652 entitled "Fast Shift Amount Decode for VMX Shift and VPERM Instructions" and filed Jun. 25, 1998; Ser. No. 09/104,653 entitled "Vector Packing and Saturation Detection in the Vector Permute Unit (VPU)" and filed Jun. 25, 1998. The content of the above-referenced applications are incorporated herein by reference.

BACKGROUND OF THE INVENTION

1. Technical Field

The present invention relates in general to consolidation of multimedia facilities and in particular to reusing existing circuitry for one multimedia instruction in place of comparable circuitry for other multimedia instructions. Still more particularly, the present invention relates to employing a crossbar within a vector permute unit for wide shifting functions required for other multimedia instructions.

2. Description of the Related Art

Multimedia applications are increasing, leading to an increased demand for multimedia facilities within processors. Processors, such as the PowerPC™ processor available from IBM Corporation of Armonk, N.Y., are increasingly incorporating such multimedia facilities. In the case of the PowerPC™, the multimedia facility is the vector multimedia extensions (VMX) facility.

Several of the instructions implemented by the VMX facility require a multiplexing function for at least one stage. For example, the traditional approach to implementing the vpack instruction, which compresses either 32 bits into 16 bits or 16 bits into 8 bits, would involve a multiplexer. An example is depicted in FIG. 3. A vpack instruction is received by decode logic 302, which generates selects for multiplexer 304 based on whether the operand 306 is being compressed from 16 bits to 8 bits or from 32 bits to 16 bits. Multiplexer 304 selects possible alternatives for the top target byte 308a from the bytes of 32 bit operand 306. Saturation multiplexers 310a and 310b, under the control of saturation detection logic 312, select between source bytes from operand 306 or their saturated values 314a and 314b for target bytes 308a and 308b. Multiplexer 304, in particular, requires a significant amount of area within the multimedia facility and may incur undesirable latency in instruction execution.

Other instructions supported by a typical multimedia facility within a processor architecture require other, specialized hardware. Shift operations, for example are traditionally performed utilizing a barrel shifter. However, this approach becomes more expensive as the shifts become wider. The ability to perform wide shifts (64 to 128 bits) is useful in performing multimedia operations, but is very expensive in hardware implementations. The area needed for a barrel shifter performing wide shifts, and the latency incurred by such a shifter, may become unacceptable.

It would be desirable, therefore, to utilize existing hardware within the multimedia facilities of a processor to performing comparable multiplexing and shifting functions for other instructions. It would further be advantageous if the resulting mechanism reduced latencies for the instructions.

SUMMARY OF THE INVENTION

It is therefore one object of the present invention to provide a method and apparatus for consolidation of multimedia facilities.

It is another object of the present invention to provide a method and apparatus for reusing existing circuitry for one multimedia instruction in place of comparable circuitry for other multimedia instructions.

It is yet another object of the present invention to provide a method and apparatus for employing a crossbar within a vector permute unit for wide shifting functions required for other multimedia instructions.

The foregoing objects are achieved as is now described. A crossbar is implemented within multimedia facilities of a processor to perform vector permute operations, in which the bytes of a source operand are reordered in the target output. The crossbar is then reused for other instructions requiring multiplexing or shifting operations, particularly those in which the size of additional multiplexers or the size and delay of a barrel shifter is significant. A wide shift operation, for example, may be performed with one cycle latency by the crossbar and one additional layer of multiplexers or a small barrel shifter. The crossbar facility thus gets reused with improved performance of the instructions now sharing the crossbar and a reduction in the total area required by a multimedia facility within a processor.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
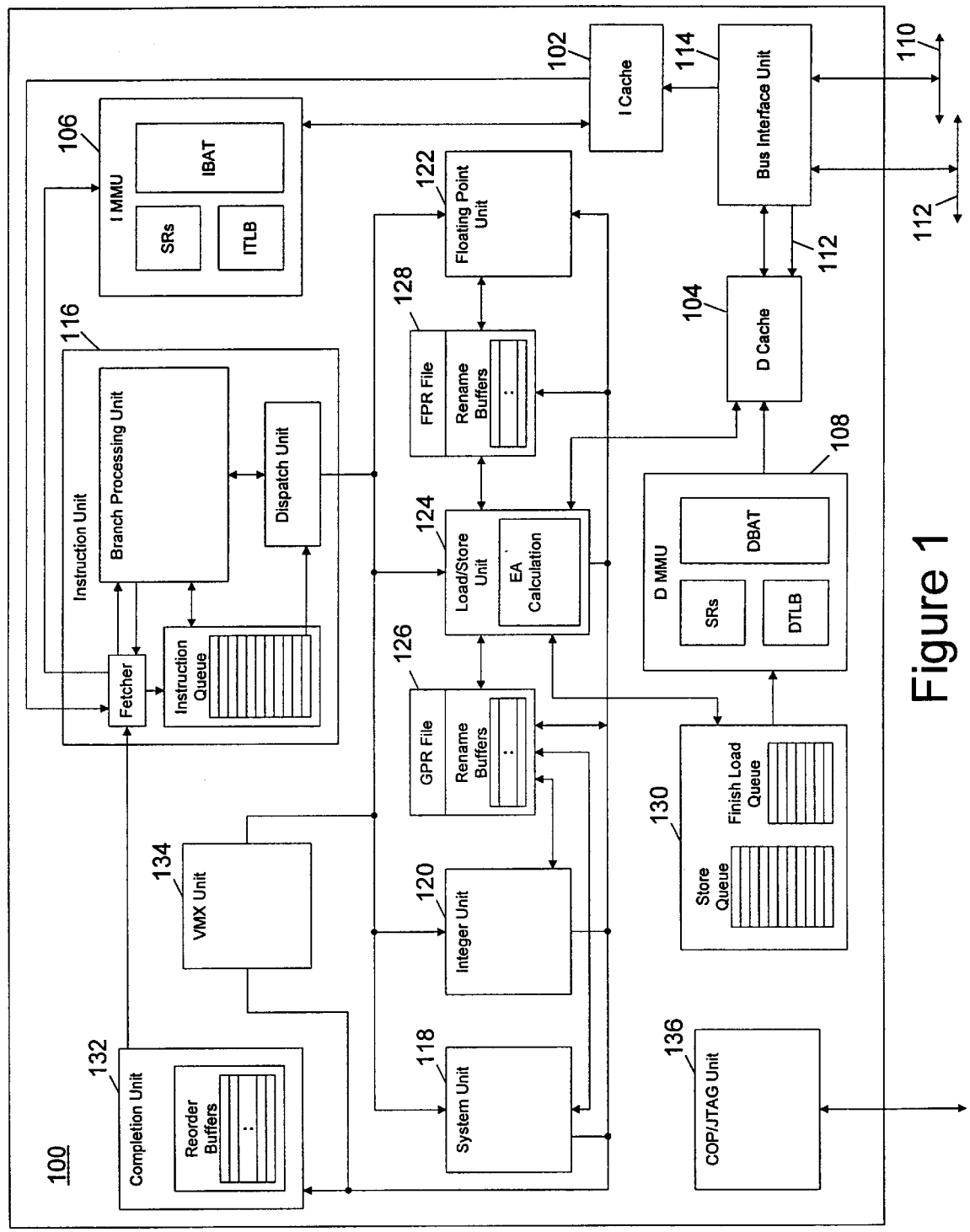
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar microprocessor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to executions units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2A:
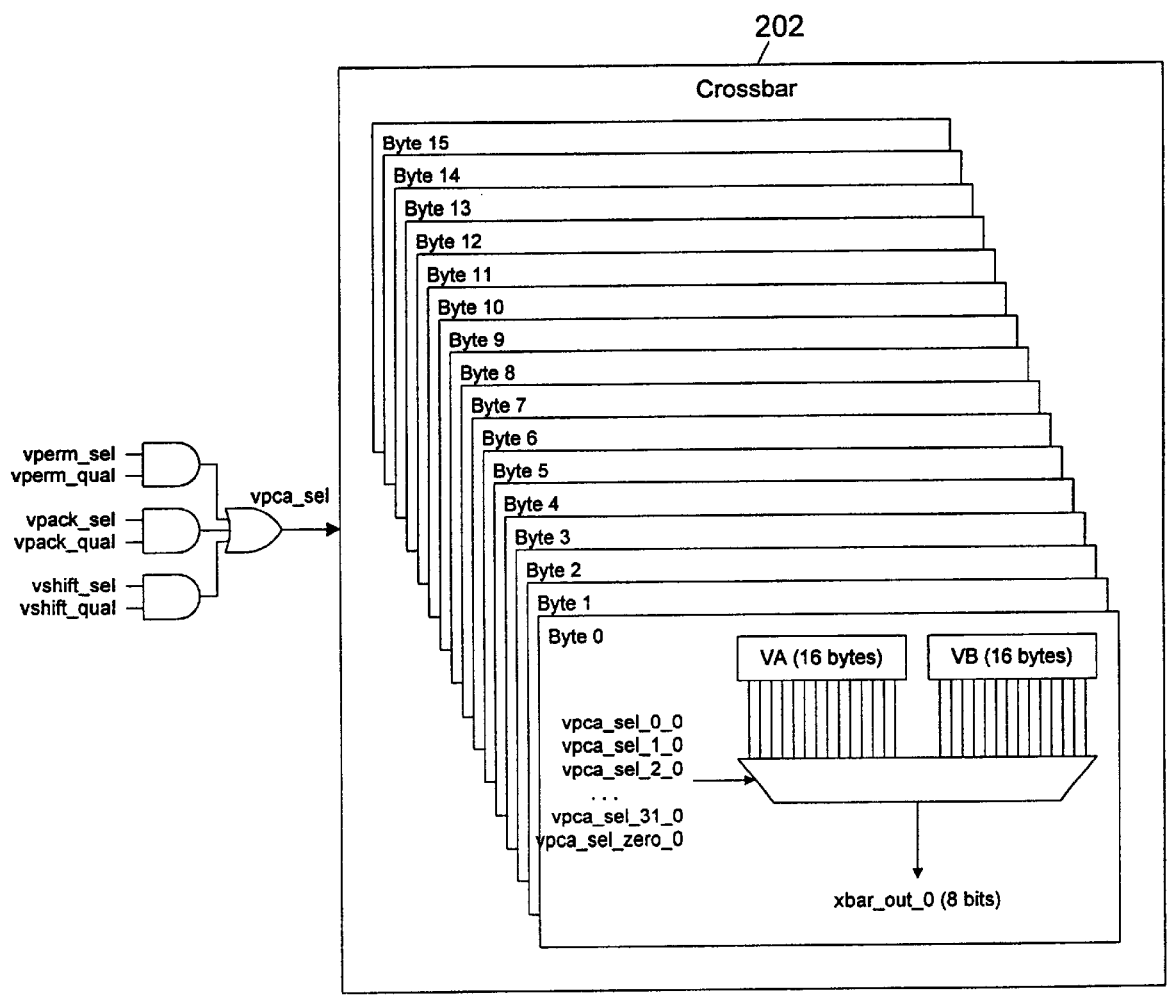
FIGS. 2A–2B are block diagrams of mechanisms for performing instructions requiring a shifting function utilizing an existing crossbar within a processor multimedia facility in accordance with a preferred embodiment of the present invention.
Figure 2B:
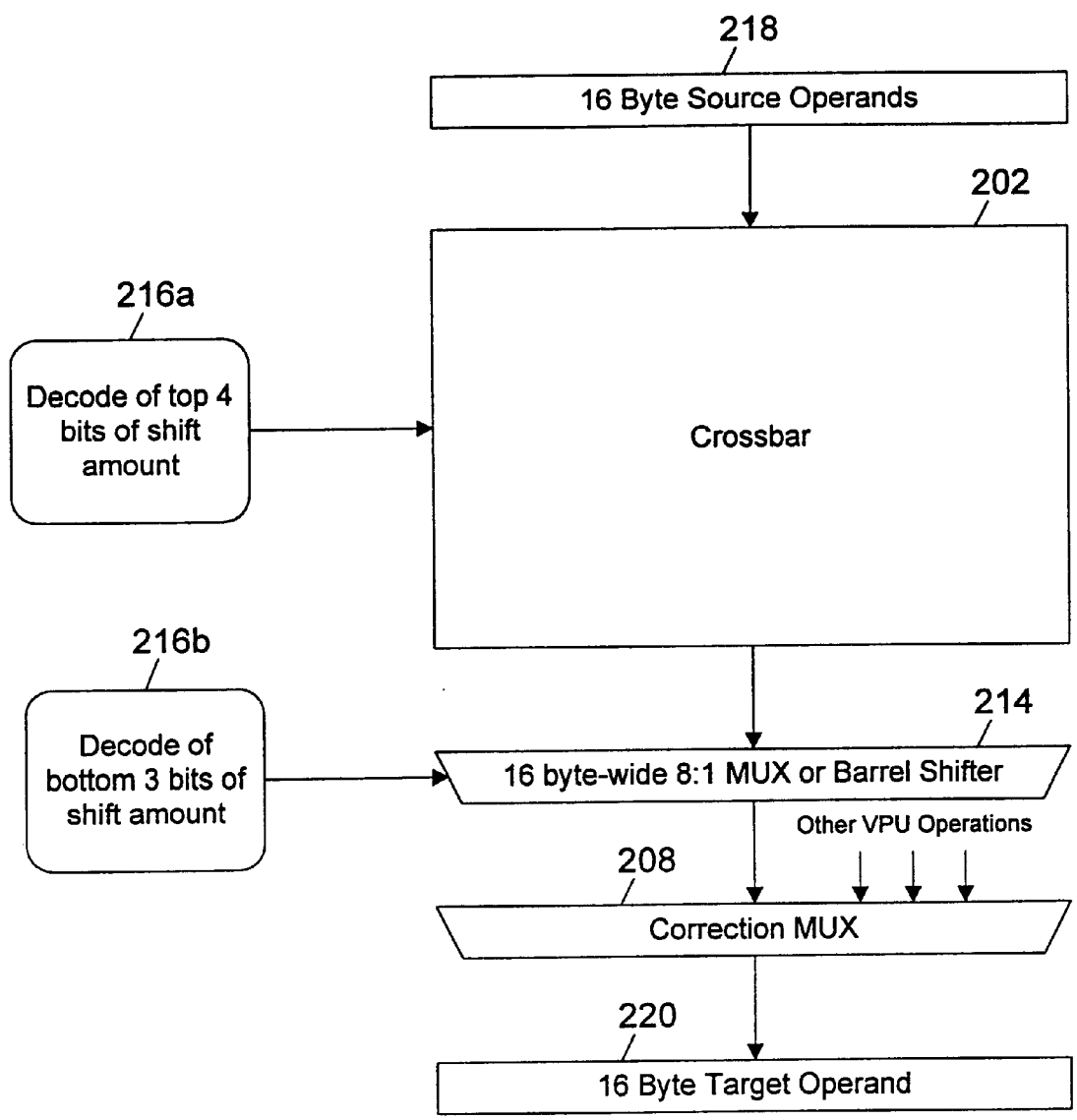

Referring now to FIGS. 2A–2B, block diagrams of mechanisms for performing instructions requiring multiplexing or shifting functions utilizing an existing crossbar within a processor multimedia facility in accordance with a preferred embodiment of the present invention are illustrated. FIG. 2A is a block diagram for a crossbar within the multimedia facilities of a processor, such as VMX unit 134 depicted in FIG. 1.

One of the sub-units of the VMX multimedia processor engine is the vector permute unit (VPU). This unit is responsible for performing byte reordering, packing, unpacking, byte shifting, etc. In particular, this unit performs byte reordering for the VMX vperm (vector permute) instruction of the PowerPC™ architecture, which reorders bytes within a source operand VA or VB according to target designations within quadword operand VC.

At the core of the VPU is a 32:16 byte-wide crossbar 202, which can place any of 32 source bytes into any of 16 target byte positions. The current implementation of the crossbar network is a set of 16 33:1 byte-wide passgate multiplexers. Each 33:1 multiplexer is controlled by 32 selects which may select from any source byte of operands VA or VB to a common target byte and a "zero select" that is utilized to select zeros in the shift cases or in cases when the crossbar is not being utilized. FIG. 2A depicts a simple diagram of the crossbar showing the flow for target byte 0 of the crossbar output, which includes a 33:1 multiplexer capable of passing any byte of operands VA or VB to target byte 0 of the crossbar output. Multiplexer selects vpca_sel_0_0 through vpca_sel_31_0 are employed to select a byte from input operand VA or input operand VB to be passed to crossbar output xbar_out_0 for target byte 0. The mechanism shown for target byte 0 is replicated for target bytes 1 through 15. The selects for each multiplexer within crossbar 202 are of the form sel_X_Y, where X is the source byte and Y is the target byte. In the present invention, crossbar 202, implemented primarily for execution of the vperm instruction, is reused for vector pack and wide shift operations as described in further detail below. Accordingly, selects for each type of instruction must be qualified by signals verifying that the appropriate type of instruction is, in fact, being executed. With a potential fan out of 512 selects, qualification of the crossbar selects may pose a timing problem, which is addressed in a related application.

FIG. 2B depicts a block diagram for a circuit implementing a wide shift operation in accordance with a preferred embodiment of the present invention. In lieu of a multiplexer or barrel shifter in accordance with the known art, crossbar 202 within the VPU is reused for the wide shift operation. By taking advantage of the characteristics of the VPU, wide shifts may be performed using crossbar 202 and one additional level of 8:1 shift multiplexers or a small, bidirectional barrel shifter 214.

In the implementation of the present invention, the top four bits of the shift amount are decoded by decode logic 216a to generate selects for crossbar 202 in byte-wise shifting the bytes of source operand 218 for target operand 220. This places the operand within 7 bits of the target position. The lower three bits of the shift amount are then decoded by decode logic 216b to generate selects for shift multiplexer/barrel shifter 214 for bit-wise shifting of the source operand. Correction multiplexer 208, also employed for other VPU operations, may be situated between the output of shift multiplexer/barrel shifter 214 and the target output 220.

The present invention allows wide shift operations to take advantage of existing hardware and, with minimal additional hardware, implement a 1 cycle latency and 1 cycle throughput wide shift operation.

While the invention has been particularly shown and described with reference to a preferred embodiment, it will be understood by those skilled in the art that various changes in form and detail may be made therein without departing from the spirit and scope of the invention.

What is claimed is:

1. A mechanism for performing data operations, comprising:
   a crossbar passing any source byte to any target byte, the crossbar receiving a source operand;
   first crossbar selects controlling the crossbar, the first crossbar selects generated in response to a vector permute instruction and reordering bytes of the source operand at a crossbar output;

a first qualifying signal for the first crossbar selects verifying that a vector permute instruction is being executed;

second crossbar selects controlling the crossbar, the second crossbar selects generated in response to a vector pack instruction and selecting a first source byte from a pair of middle bytes within the source operand for a top target byte at the crossbar output and a second source byte within the source operand for a second target byte at the crossbar output;

a second qualifying signal for the second crossbar selects verifying that a vector pack instruction is being executed;

third crossbar selects controlling the crossbar, the third crossbar selects generated in response to a wide shift instruction and byte-wise shifting the source operand at the crossbar output; and a third qualifying signal for the third crossbar selects verifying that a wide shift instruction is being executed.

2. The mechanism of claim 1, further comprising:

a correction multiplexer connected to the crossbar output, the correction multiplexer, in response to the vector pack instruction, selecting between the top target byte at the crossbar output and its saturated value and between the second,target byte at the crossbar output and its saturated value.

3. The mechanism of claim 1, further comprising:

a shifting mechanism connected to the crossbar output, the shifting mechanism, in response to the wide shift operation, bit-wise shifting the crossbar output by seven bits or less.

4. The mechanism of claim 1, further comprising: decode logic generating the third crossbar selects for the crossbar from a first portion of a shift amount to byte-wise shift a source operand to within a predetermined interval from the shift amount.

5. The mechanism of claim 4, wherein the predetermined interval is 7 bits.

6. The mechanism of claim 4, wherein the first portion of the shift amount comprises a top four bits of the shift amount.

7. The mechanism of claim 4, wherein the first portion of the shift amount comprises an encoded integer number of bytes.

8. The mechanism of claim 3, further comprising:

decode logic generating selects for the shifting mechanism from a second portion of the shift amount to bit-wise shift the output of the crossbar to the shift amount.

9. The mechanism of claim 8, wherein the second portion of the shift amount comprises a bottom three bits of the shift amount.

10. The mechanism of claim 8, wherein the second portion of the shift amount comprises an encoded integer number of bits less than eight.

11. The mechanism of claim 3, wherein the shifting mechanism comprises a level of 8:1 multiplexers.

12. The mechanism of claim 3, wherein the shifting mechanism comprises a bidirectional barrel shifter.

13. A method of performing data operations, comprising:

transmitting a source operand to a crossbar passing any source byte to any target byte;

generating first crossbar selects controlling the crossbar, the first crossbar selects generated in response to a vector permute instruction and reordering bytes of the source operand at a crossbar output;

generating a first qualifying signal for the first crossbar selects verifying that a vector permute instruction is being executed;

generating second crossbar selects controlling the crossbar, the second crossbar selects generated in response to a vector pack instruction and selecting a first source byte from a pair of middle bytes within the source operand for a top target byte at the crossbar output and a second source byte within the source operand for a second target byte at the crossbar output;

generating a second qualifying signal for the second crossbar selects verifying that a vector pack instruction is being executed;

generating third crossbar selects controlling the crossbar, the third crossbar selects generated in response to a wide shift instruction and byte-wise shifting the source operand at the crossbar output; and generating a third qualifying signal for the third crossbar selects verifying that a wide shift instruction is being executed.

14. The method of claim 13, further comprising:

connecting a correction multiplexer to the crossbar output, wherein the correction multiplexer, in response to the vector pack instruction, selects between the top target byte at the crossbar output and its saturated value and between the second target byte at the crossbar output and its saturated value.

15. The method of claim 13, further comprising:

connecting a shifting mechanism to the crossbar output, wherein the shifting mechanism, in response to the wide shift operation, bit-wise shifts the crossbar output by seven bits or less.

16. The mechanism of claim 15, wherein the step of generating third crossbar selects controlling the crossbar, the third crossbar selects generated in response to a wide shift instruction and bytewise shifting the source operand at the crossbar output further comprises:

generating the third crossbar selects for the crossbar from a first portion of a shift amount to byte-wise shift a source operand to within a predetermined interval from the shift amount.

17. The method of claim 16, wherein the step of generating the third crossbar selects for the crossbar from a first portion of a shift amount to byte-wise shift a source operand to within a predetermined interval from the shift amount further comprises:

generating the third crossbar selects from a top four bits of the shift amount.

18. The method of claim 16, wherein the step of generating the third crossbar selects for the crossbar from a first portion of a shift amount to byte-wise shift a source operand to within a predetermined interval from the shift amount further comprises:

generating the third crossbar selects from an encoded integer number of bytes within the first portion of the shift amount.

19. The method of claim 16, further comprising:

generating selects for the shifting mechanism from a second portion of the shift amount to bit-wise shift the output of the crossbar to the shift amount.

20. The method of claim 19, wherein the step of generating selects for the shifting mechanism from a second portion of the shift amount to bit-wise shift the output of the crossbar to the shift amount further comprises:

generating the selects for the shifting mechanism from a bottom three bits of the shift amount.

* * * * *